Feb. 27, 1968  H. N. GRILLOT  3,370,875
TWINE KNOTTER
Filed July 28, 1966  3 Sheets-Sheet 1
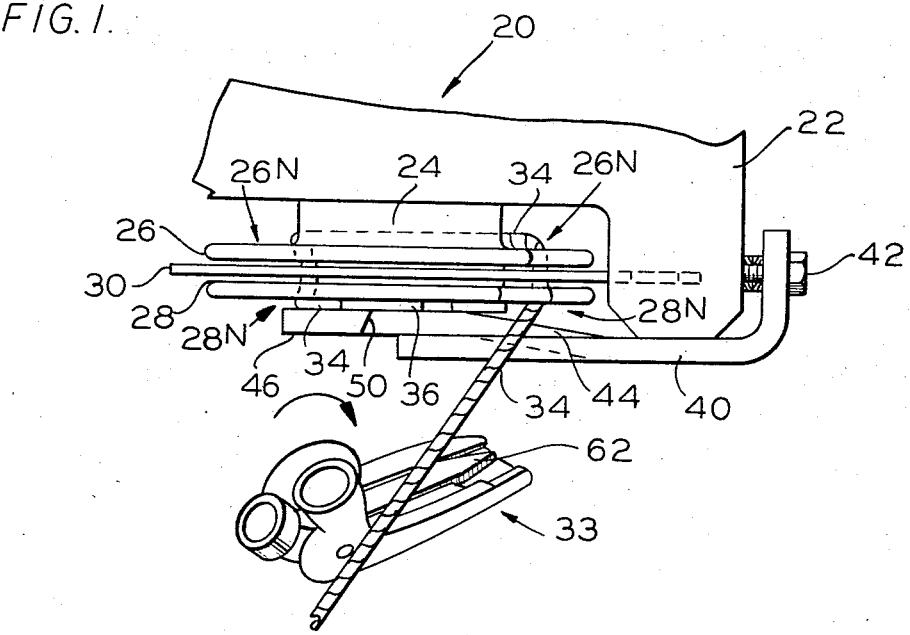
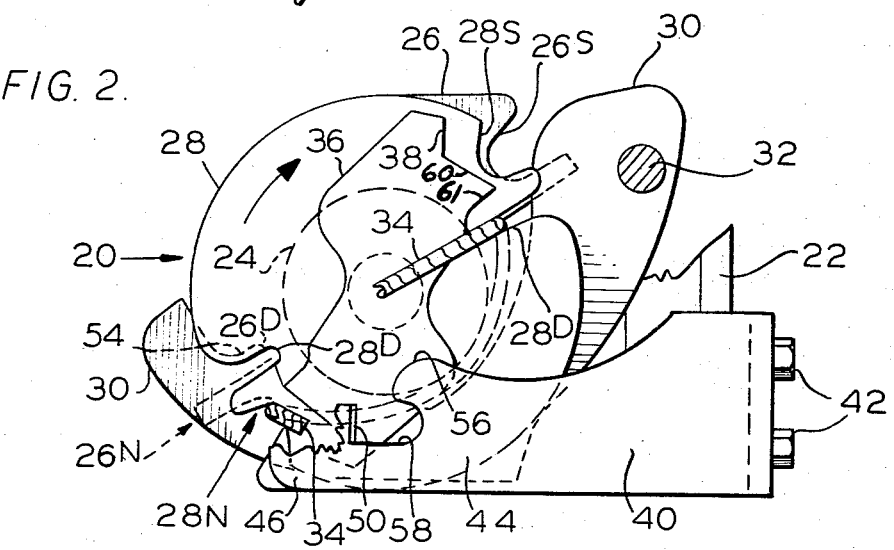
INVENTOR
HOMER N. GRILLOT
ATT'Y Feb. 27, 1968  H. N. GRILLOT  3,370,875
TWINE KNOTTER
Filed July 28, 1966  3 Sheets-Sheet 2
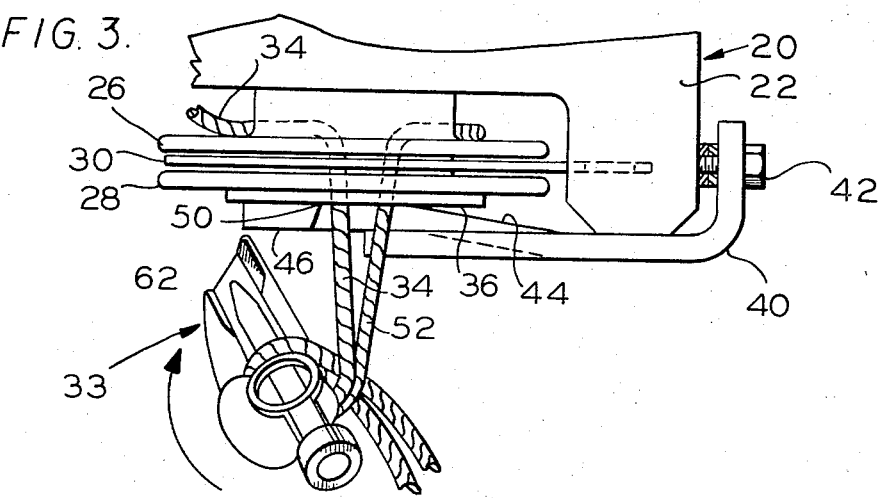
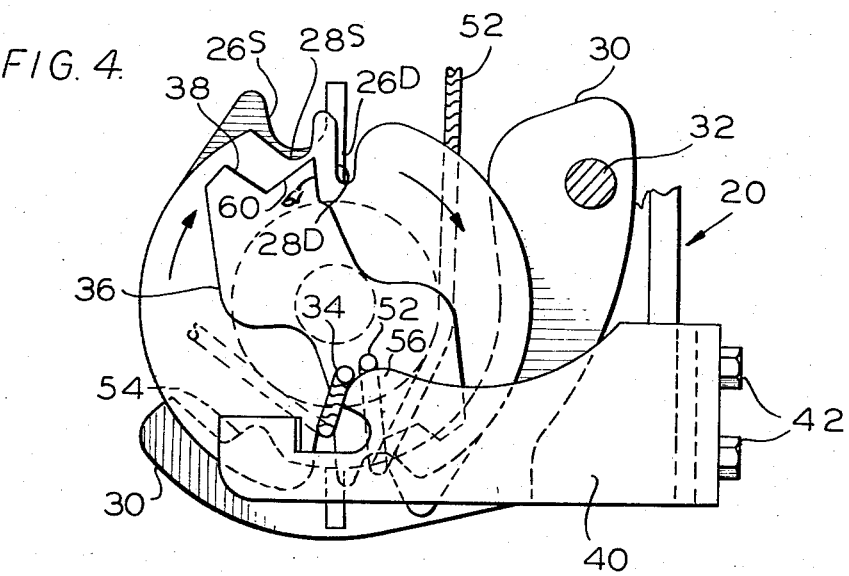
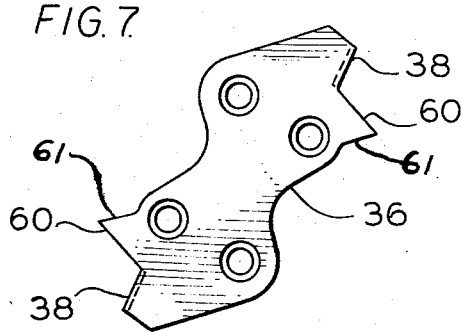
INVENTOR
HOMER N. GRILLOT
Ronald C. Kemp
ATT'Y Feb. 27, 1968   H. N. GRILLOT   3,370,875
TWINE KNOTTER
Filed July 28, 1966   3 Sheets-Sheet 3
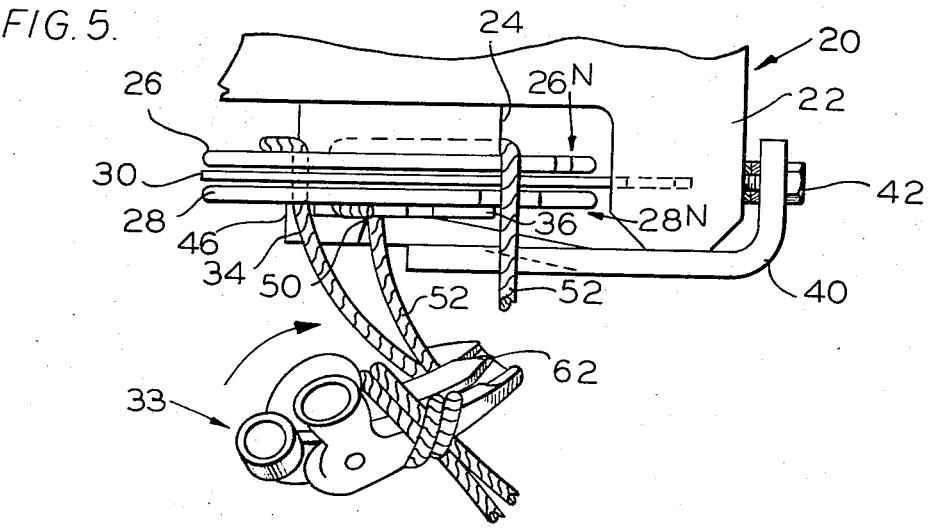
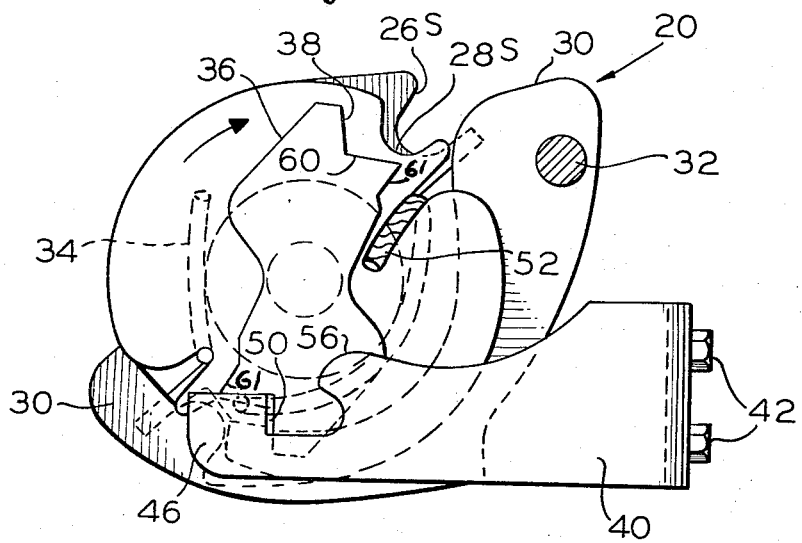
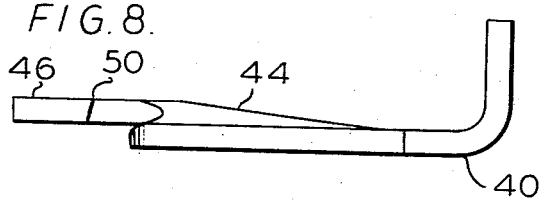
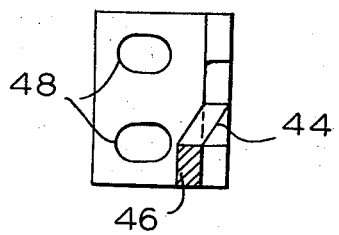
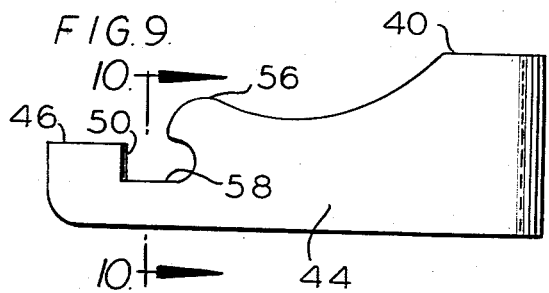
INVENTOR
HOMER N. GRILLOT
Ronald C. Kamp
ATT'Y 3,370,875
TWINE KNOTTER
Homer N. Grillot, Naperville, Ill., assignor to International Harvester Company, Chicago, Ill., a corporation of Delaware
Filed July 28, 1966, Ser. No. 568,649
7 Claims. (Cl. 289—14)

The present invention relates generally to twine knotters and, more particularly, to a twine cutter mechanism for such knotters.

In the hay balers which have been commercially available in the past and which employ twine as a means of encircling and restraining the bale, it has been common practice to utilize a single knife to sever the twine. Severing of the twine when employing a single knife necessitates either moving the knife against the tensioned twine or moving the tensioned twine against a stationary knife. In each case, the exact time of the cut, in relation to the other cyclic operations necessary for forming the knot, is a function of or related to a variety of factors, e.g. tension to which the twine is subjected, the sharpness of the knife edge, the thickness of the twine and the strength of the twine, i.e. the resistance of the twine to being severed. The proper timing of the cut is critical to efficient operation of the knotter, and in particular the timing of the cut is necessary to assure that: (1) the twines are held and positioned correctly relative to the hook, (2) the twines are wrapped correctly on the knotter hook, and (3) the twines are stripped correctly from the hook. Some of the problems encountered when the cutting action is effected too early or too late in the cycle are: (1) the twine being improperly stripped from the hook which results in either no knot being formed or a knot being formed in only a single strand of twine, the twine from the needle being permitted to slip from the knot, and (2) the twine being incorrectly positioned on the knotter hook by the needle. When improper knots occur, it is necessary to stop the baler and make corrective adjustments. The fact that a variety of twine types are available and that variations occur within each type increases the twine cut time problem and necessitates modifications to and adjustments in the baler knotter.

It is, therefore, an object of the present invention to provide a twine knotter which will perform the cutting operation at a constant time in the knot-forming cycle regardless of the type or grade of twine being utilized, and which will accomplish positive positioning of the twine against the stationary knife edge.

It is also an object of this invention to provide a twine knotter which utilizes a positive shearing action to sever the twine, wherein such shearing is unrelated to the tension in the twine.

It is a further object of this invention to provide a cutter mechanism for a knotter which is self-sharpening.

It is another object of this invention to provide a cutter mechanism for a twine knotter which is capable of accepting a variety of types and grades of twine, and which does not require resetting or adjustment when the twine type or grade is changed in order to maintain a constant twine cut time.

It is still another object of this invention to provide a twine knotter which will produce a relatively long twine path early in the tying cycle to render additional twine, and which will also provide another relatively short path late in the cycle to allow additional twine to facilitate twine wrapping on the knotter hook and to preclude tensioning twine during that part of the cycle in which the knot tends to be pulled from the hook, and further to facilitate locking the twine between the disks and the keeper blade.

It is a still further object of this invention to provide a twine knotter mechanism in which the disk twine tail is firmly held to resist rendering during bale formation.

It is also an object of this invention to provide a twine knotter in which the twine is cut with a long needle twine tail to reduce the possibility of the needle twine being pulled out of the knot, especially as it is being stripped from the knotter hook.

It is another object of this invention to provide an improved twine knotter which produces knots of maximum strength, which is relatively simple to construct and maintain, which requires a minimum of adjustment, and which can be incorporated into commercially available knotters with minimal alteration.

These and other objects and many of the attendant advantages will become more readily apparent upon a perusal of the following description and the accompanying drawings, wherein:

FIGURE 1 is a top plan view of the twine knotter according to the present invention in its "home" position;

FIGURE 2 is a side elevational view of the knotter mechanism of FIGURE 1, but with portions broken away and the knotter hook eliminated for clarity;

FIGURE 3 is a view similar to FIGURE 1 showing the mechanism rotated from "home" position;

FIGURE 4 is a view, which is similar to FIGURE 2, of a mechanism shown in FIGURE 3;

FIGURE 5 is a view similar to FIGURE 1 with the mechanism rotated an additional amount;

FIGURE 6 is a view, which is similar to FIGURE 2, of the mechanism shown in FIGURE 5;

FIGURE 7 is a plan view of the rotating knife;

FIGURE 8 is a top plan view of the stationary knife;

FIGURE 9 is a side elevational view of the stationary knife of FIGURE 8; and

FIGURE 10 is a sectional view taken on line 10—10 of FIGURE 9.

Referring now to the details of the mechanism shown in FIGURES 1 and 2, a twine knotter, of the type disclosed in U.S. Patent No. 3,101,963 issued to Sullivan et al., is illustrated in its "home" position, i.e. that position the elements thereof assume before initiating the tying of a knot. The knotter mechanism, which is generally indicated at 20, is provided with a frame 22 on which a shaft 24 is rotatably mounted. A rear disk 26 and a front disk 28 are axially spaced on and affixed to the shaft 24. A keeper blade 30 is pivotally mounted by means of pin 32 to the frame 22, and is positioned between the two disks 26 and 28. Each disk is provided with two sets of notches, indicated generally at 26n and 28n, with each set spaced 180 degrees apart. Since the notches of each set are identical, detailed reference will be made herein to only that set appearing in the upper right portion of FIGURE 2. The front disk 28 has its shallow notch 28s and a deep notch 28d and, similarly, the rear disk has a shallow notch 26s and a deep notch 26d. In the "home" position, as shown in FIGURES 1 and 2, the twine extends from the breastplate finger, not shown, where it is positioned to facilitate encirclement of the bale to be formed, and continues above and in close proximity to the knotter hook 33, across both disks 26 and 28, wherein the twine is received in the deep notches 26d and 28d, along the backside of the rear disk below the shaft 24, and is wedged between two disks in the shallow notches 26s and 28s by the keeper blade 30. This portion of the twine is referred to as the disk twine 34. A rotating blade 36 is affixed to the shaft 24 to rotate therewith, and for convenience, may be secured by the same fastening means which secure the front disk 28 to the shaft 24. A pair of knife edges 38 is provided on the blade 36 and each edge is positioned a few degrees behind, relative to the direction of rotation, the shallow notch 28s of the front disk 28. A stationary blade 40 is affixed to the frame 22 by means of bolts 42. The blade 40 has a twisted portion 44 providing an offset 46, which is engageable with the rotating blade 36. A pair of elongated slots 48, as best seen in FIGURE 10, are provided in the stationary blade 40 to permit this blade to be forced against the rotating blade 36 as the bolts 42 are tightened, thereby assuring that a rubbing and concomitant sharpening action occurs between the cutting edge 38 of the rotating blade and the cutting edge 50 of the stationary blade.

While the mechanism 20 is in its "home" position, as illustrated in FIGURES 1 and 2, the needle, not shown, will position the twine within the shallow notches 26s and 28s and the conventional gearing mechanism, also not shown, but fully illustrated in Sullivan et al., will cause rotation or cycling of the knotter hook 33 and the shaft 24. That portion of the twine introduced to the shallow notches 26s and 28s by the needle will be referred to as the needle twine 52. Upon initial rotation, the free end of the disk twin 34 will bear against the tang 54 on the keeper blade forcing the blade to pivot about the pin 32, extracting the keeper blade from between the disks, and thereby releasing the free end of the disk twine. Simultaneous with the rotation of the shaft 24, the knotter hook 33 will rotate causing both the disk twine 34 and the needle twine 52 to be wrapped around the hook 33. At this point in the cycle, the twines 34 and 52 are passing over a hump 56 formed on the stationary blade 40. As the mechanism continues to cycle, the twines slip off of the hump 56 and into a recess 58. Once the twines are positioned within the recess 58, the path they must follow is shortened and a discrete amount of slack is created in both twines. As the twines slip off of the hump 56, the rotating blade 36 contacts the inner surface of the twisted portion 44 which functions as a camming surface to force the stationary blade and its knife edge 50 away from the front disk 28. This camming force is sufficient to deflect the stationary blade 40 slightly and create a positive shearing action as the knife edge 38 passes the knife edge 50. In addition to the improved cutting performance, the rubbing contact between the blades tends to sharpen and clean the knife edges. A forwardly inclined edge 61 on the blade 36, which joins with a projection 60 formed on the leading edge of the rotating blade 36, prevents the disk twine from entering the shear area by contacting the disk twine, which at this point in the cycle is inclined upward from the bottom of the deep notch 28d toward the hook 33, and urging the disk twine toward the center of the disks. However, the needle twine 52 is positioned within the shallow notches and is trapped by the projection 60 on the leading edge of the rotating blade so that the twine cannot slip up over the knife edge 50. The needle twine 52 is now completely confined by the projection 60, the knife edge 50, the lower surface of the recess 58 and the knife edge 38, and cannot escape the shearing action between the two knife edges as they pass one another. The twine is now severed and both strands are captured under the knotter hook bill 62, as shown in FIGURE 5, and will be pulled through the loop, which was formed on the hook 33 during the initial approximately 270 degrees of rotation, as further movement of the bale itself strips the twine from the hook thereby forming the knot.

In the position shown in FIGURES 5 and 6, the knotter hook 33 has completed its cycle and has returned to its "home" position. However, the shaft 24 has not completed its cycle and must rotate the disks 26 and 28 an additional slight amount. This additional rotation causes the cut end of what was formerly the needle twine 52, which end is positioned within the shallow notches 26s and 28s, and against the tang 54 on the keeper blade 30, to be inserted deeper into the space between the two disks 26 and 28. The thrust exerted on the tang 54 by the cut end of the twine 52 will cause the keeper blade to rotate about the pivot pin 32 thereby inserting the tang and the cut end deeper into the aforementioned space. The shaft 24, the disks 26 and 28 and the rotating blade 36 mounted thereon, and the keeper blade 30 are now oriented in their "home" position completing the cycle. The twine 52 which was formerly designated as the needle twine, having been positioned within the disks by the needle, now becomes the disk twine for the best cycle.

It is important to note that the shallow notches have already passed the stationary knife edge 50 before the knife edge 38 on the rotating blade cooperates with the knife edge 50 to sever the twine. The purpose for this timing, which is effected by the relative angular positions of the shallow notches and the knife edge 38, is to provide a relatively long tail on the twine 52 in order to preclude the free end of the severed twine from being pulled out or rendered from the front disk 28 by the action of the tang 54. That is, when the keeper blade 30 is forced up into the space between the two disks 26 and 28, the free end of the twine is forced into a U-shaped configuration with one of the legs of the U wedged between the keeper blade 30 and the rear disk 26 and the other leg wedged between the keeper blade and the front disk 28, and if the tail on the twine is too short, it will be pulled out of or dislodged from the gripping action between the front disk 28 and the keeper blade 30 thereby reducing the force with which the twine is held. Such a feature is important because the twine is being subjected to a certain amount of tension as the next bale is being formed and if the holding force of the keeper blade and the disks is insufficient the twine will be rendered or extracted from the shallow notches. When this happens it is necessary to stop the baler and re-thread or re-engage the twine properly within the disks in order that the knotter mechanism will function correctly.

Another noteworthy feature concerns the improved knot tying ability of the present invention. As was previously stated, the hump 56 and the recess 58 function in the cycle of the knotter mechanism to provide a variable length path which the twine must follow in going from the disks to the knotter hook 33. The slack which is introduced as the twines slip off the hump 56 and into the recess 58 performs two functions. The first of these is to prevent the loop from being too tightly wound on the knotter hook. If the loop is too tightly wound, inadequate space between the loop and the knotter hook is provided for the disk twine and needle twine, which twines must be pulled through the aforementioned space to form the knot. The introduction of slack assures that the loop will remain loose on the knotter hook so that the twines may be easily drawn between the hook and the loop to form a strong knot on every tying cycle. In addition, a tightly wound loop makes stripping of the knot from the hook difficult. The slack, by maintaining a loosely wound loop, insures that the knot will be readily stripped from the hook. The second function of the slack introduced is to provide a longer tail on the knot portion of the needle twine 52 in order to preclude that tail from being drawn completely through the loop during formation of the knot and stripping from the knotter. That is, if the tail of the needle twine forming part of the knot is too short the bill 62 will pull it completely through the loop with the result that the knot will be a single bow rather than a double bow. A double bow knot, i.e. a knot in which both of the twines are retained by the tightened loop, is much stronger that a single bow knot and hence is highly desirable. The shortening of the path, which shortening is provided by the cooperation of the hump 56 and the recess 58, provides some excess twine in order to assure that both of the tails will be retained by the tightened loop to form a double bow knot.

It can, therefore, be appreciated from the foregoing description that the present invention provides a knotter mechanism which is more reliable, is easily maintained, and which produces knots of high strength.

Obviously, many modifications and variations of the present invention are possible in the light of the above teachings. It is, therefore, to be understood, that within the scope of the appended claims, the invention may be practiced otherwise than as specifically described.

What is claimed is:

1. In a twine knotter having a pair of notched disks affixed to a cyclic rotatable shaft carried by a frame, the improvement comprising:
 a rotating blade having a first knife edge affixed to said shaft for rotation therewith,
 a stationary blade having a second knife edge affixed to said frame,
 means biasing said stationary blade into sliding engagement with said rotating blade,
 and means for positioning and retaining said twine between said edges to effect shearing of the twine as the rotating blade moves past said stationary blade.

2. In a twine knotter according to claim 1 wherein said means for positioning and retaining includes a recess in said stationary blade and a projection on said rotating blade, said projection being substantially transverse to said first knife edge.

3. In a twine knotter according to claim 1 and further comprising:
 means on said stationary blade for shortening the path of the twine prior to shearing the twine, whereby slack is introduced therein.

4. In a twine knotter according to claim 3 wherein; said last-mentioned means includes a hump formed on said stationary blade and a recess formed in said stationary blade adjacent to said hump.

5. In a twine knotter according to claim 4 wherein; said recess is formed partially by said second knife edge.

6. In a twine knotter according to claim 1 wherein; said notched disks include shallow notches and deep notches and said rotating blade is positioned on said shaft to locate said first knife edge rearward of said shallow notches with relation to the direction of rotation of said shaft whereby a long tail is provided on the twine.

7. In a twine knotter according to claim 2 wherein; said notched disks include shallow notches for receiving the twine to be severed and deep notches for receiving the twine which is not to be severed,
 said first knife edge being positioned rearward of said shallow notches relative to the direction of rotation of said shaft, and
 an inclined edge on said rotating blade joining with the tip of said projection,
 whereby said edge will urge said twine not to be severed away from said second knife edge and said projection will trap said twine to be severed within said recess.

References Cited

UNITED STATES PATENTS

| | | | |
|---|---|---|---|
| 988,222 | 3/1911 | Stange | 289—13 |
| 2,382,210 | 8/1945 | Cummins | 289—13 |
| 2,815,233 | 12/1957 | Collins | 289—13 |

LOUIS K. RIMRODT, *Primary Examiner.*